United States Patent
Dykstra

(10) Patent No.: US 7,636,614 B2
(45) Date of Patent: Dec. 22, 2009

(54) SYSTEMS FOR MANAGING FLOW CONTROL VALVES IN PROCESS SYSTEMS

(75) Inventor: Jason D. Dykstra, Addison, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 154 days.

(21) Appl. No.: 11/700,397

(22) Filed: Jan. 31, 2007

(65) Prior Publication Data

US 2008/0183310 A1    Jul. 31, 2008

(51) Int. Cl.
G05D 7/00 (2006.01)
G05B 13/02 (2006.01)

(52) U.S. Cl. .................. 700/282; 700/29

(58) Field of Classification Search ............ 702/85, 702/94, 100, 98; 700/29, 282, 295, 32
See application file for complete search history.

(56) References Cited

U.S. PATENT DOCUMENTS

| | | | |
|---|---|---|---|
| 5,043,863 A * | 8/1991 | Bristol et al. | 700/45 |
| 6,046,685 A | 4/2000 | Tubel | |
| 6,260,004 B1 | 7/2001 | Hays et al. | |
| 7,039,473 B2 * | 5/2006 | Corban | 700/207 |
| 7,243,052 B2 * | 7/2007 | Friman | 702/199 |
| 2002/0148644 A1 | 10/2002 | Schultz et al. | |
| 2004/0088115 A1 | 5/2004 | Guggari et al. | |
| 2006/0235627 A1 * | 10/2006 | Dykstra et al. | 702/23 |

FOREIGN PATENT DOCUMENTS

| | | |
|---|---|---|
| EP | 0 315 391 A2 | 5/1989 |
| EP | 1 227 215 A2 | 7/2002 |
| GB | 2 226 633 A | 7/1990 |
| WO | WO 2004/005661 A2 | 1/2004 |

OTHER PUBLICATIONS

Foreign communication related to a counterpart application dated Jul. 16, 2008.

* cited by examiner

*Primary Examiner*—Albert DeCady
*Assistant Examiner*—Sivalingam Sivanesan
(74) *Attorney, Agent, or Firm*—John W. Wustenberg; Groover & Associates

(57) ABSTRACT

Systems for managing the operational condition of flow control valves in process systems. As a control valve experiences mechanical wear during operation, the physical changes to the valve can alter its dead band and flow coefficient. A non-linear dynamic model determines the present dead band by modeling the relationship between the actual flow through the valve and the commanded drive signal to the valve. The present valve flow coefficient can be determined by removing the dead band from the drive signal and using that modified signal in a flow rate model for the valve to adaptively find the flow coefficient value which matches the predicted flow from the flow rate model to the present measured flow from a flow rate sensor. The present dead band and flow coefficient can be used to update valve control algorithms and to make valve maintenance decisions.

20 Claims, 12 Drawing Sheets

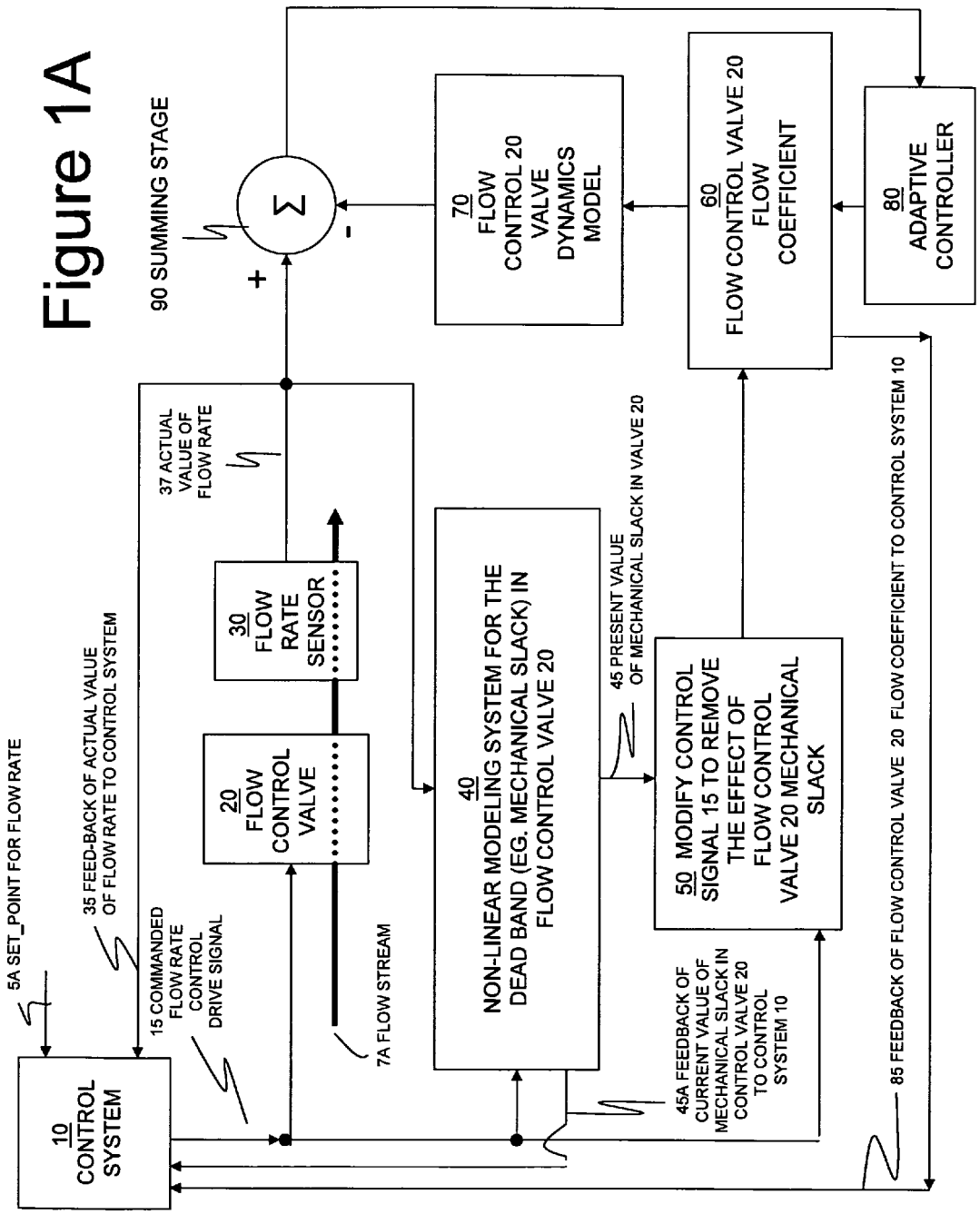

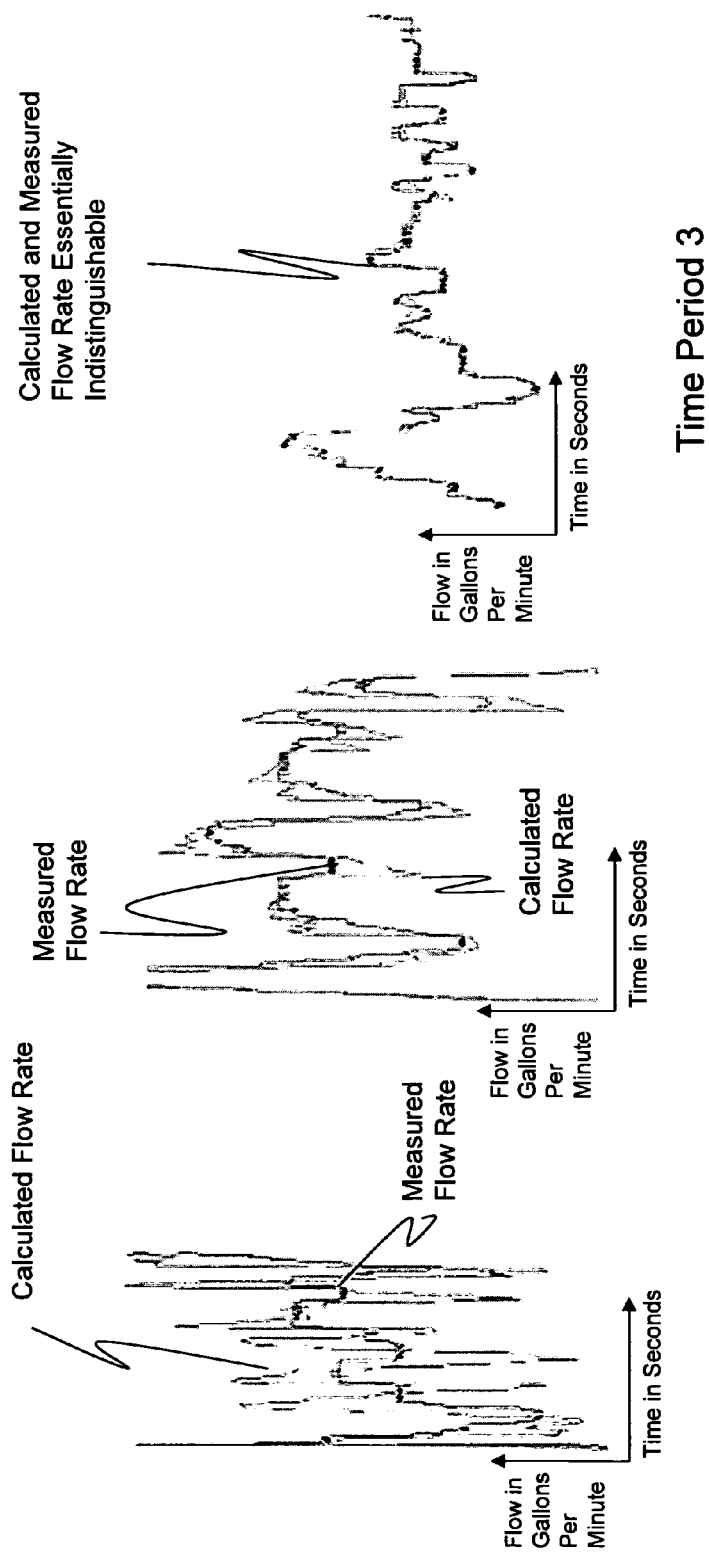

SYSTEMS FOR MANAGING FLOW CONTROL VALVES IN PROCESS SYSTEMS

BACKGROUND AND SUMMARY OF THE INVENTION

The following applications filed concurrently herewith are not necessarily related to the present application, but are incorporated by reference herein in their entirety: "Methods to Monitor System Sensor and Actuator Health and Performance" (U.S. patent application Ser. No. 11/700,735, filed simultaneously with the effective filing date of the present application; "Systems for Monitoring Sensor and Actuator Health and Performance" (U.S. patent application Ser. No. 11/700,396, filed simultaneously with the effective filing date of the present application; and "Methods for Managing Flow Control Valves in Process Systems" (U.S. patent application Ser. No. 11/700,533, filed simultaneously with the effective filing date of the present application.

Process plants, such as those located at a modem hydrocarbon production site, consist of many different pieces of equipment, each of which can be linked together to form a total process, or sub-units, such as various unit operations and sub-processes. These can be controlled using a network of control loops to achieve a particular end result for the process or a particular unit operation. Each control loop usually controls a particular process variable such as the flow rate of a material. The objective of the loop is to keep the process variable within a required operating range, usually at a desired set-point, to ensure the targeted process result. Each loop experiences, via external sources, or sometimes from internal creation by the loop itself, disturbances that cause the process variable to move away from the set-point. Additionally, interaction with other loops in the process network can cause disturbances that can affect the process variable.

To assist control loops, sensors gather process variable data. For example, on a drilling rig, the drilling mud fluid must be provided within specific compositional and flow stream parameters. Sensors can monitor the flow rate of the mud, pressure, density, and other process variables, and this information is typically fed back to a control unit which operates individual control loops for each of the controlled variables.

Sometimes, a particular process variable is not easily measured. In those instances process variable "observers" are used to provide the indirect measurement, or inference, of a particular process variable. See U.S. patent application Ser. No. 11/121,144 as Publication Number US 2006/0235627, filed May 3, 2005, entitled "Methods and Systems for Estimating Density of a Material in a Mixing Process", to Jason D. Dykstra and Justin A. Borgstadt, for an example of a density observer, which is hereby incorporated by reference in its entirety.

Within a control unit, each control loop normally has its own controller which has a specifically-tailored algorithm to achieve a particular process variable control function. The controller usually processes the sensor and set-point information and then decides what must be done to get the process variable back to set-point when a disturbance occurs. This decision takes the form of a control signal. Once a control signal is generated, a "final control element" must implement the signal from the controller and apply it to the physical process. Examples of common final control elements for fluid applications are control valves, speed controlled-pumps, and speed-controlled compressors. Common final control elements for solids-handling applications are variable-speed drives for material flow control devices such as screw conveyors, belt feeders, slide gate valves, and rotary feeder valves.

In particular, flow control valves are very common in process control applications. They act to increase or decrease the flow of a fluid or solid, in response to a control signal, where a fluid can be a liquid, gas, or vapor, or various combinations thereof. A flow control valve generally consists of at least a valve body, a moveable member within the body for adjusting the open area for flow, a valve-to-actuator linkage, and an actuator.

Actuators are powered devices used by an automatic controller to convert a control signal into movement. Actuators are typically powered pneumatically, hydraulically, electrically, or mechanically. For flow control valves, actuators convert the control signal to a physical action via the control valve linkage. Such linkages, being mechanical devices, are subject to wear over time, resulting in many cases, as looseness, or mechanical slack. Such slack in actuator-to-valve connections creates a phenomena called "valve slop". Thus, when the actuator moves the linkage in one direction based on a control signal, there is no opening or closing of the valve until the linkage moves far enough to "take-up" the slack caused by wear.

To illustrate, FIG. 3 shows an end view of an example rotary-actuated valve shaft 350 as a component of a rotary control valve. The valve was initially in fully closed 351 position 1. The valve actuator was then sent a signal to make a 45 degree rotation 354 to achieve desired position 2 shown as 353. Assuming the actuator-valve assembly is worn and has mechanical linkage slack, the actuator will have to first move to take up the "slack" before the shaft actually begins to turn. If the slack in the actuator linkage is equivalent to 45 degrees of rotation, shown as 356, then the actuator will need to signal 90 degrees of rotation shown as 352 to achieve 45 degrees of rotation for desired position 2. The span of unacted-upon control signal, prior to the initiation of movement, is a component of what is referred to as control valve "dead band." In process control, the term "dead band" is defined as the range through which an input signal can be varied, upon reversal of direction, without initiating an observable change in the output signal. Said differently, dead band results from a temporary discontinuity between the input and output of a device when the input to the device changes direction.

FIG. 4 graphically illustrates the dead band concept as applied to flow control valves. The controller signal ("CS") is the input to the valve assembly (to move the actuator), shown as the horizontal axis 410. The valve stem displacement "D", which can be either linear or rotary, is shown on the vertical axis 400, which usually is expressed as "% OPEN" as noted in 440, where % OPEN is D divided by total available D times 100. For vertically-actuated valves, it can also be distance traveled. For rotary valves, it can also be expressed as % ROTATION, or in units of degrees or radians. Dead band is typically expressed as a percent of the input control signal span. Dead band at a first time period (T=1) is shown as span 420. Thus, as control signal is increased from X to Y, no displacement of the valve stem or shaft occurs due to the slack in the actuator-to-valve linkage, as previously described. Then, as CS goes to Z, the displacement occurs as displacement 440. However, any time the controller output reverses direction, the controller signal must again pass through the dead band. This is shown in the movement from Z in the reverse direction of CS to point XX wherein no displacement occurs (e.g. valve % OPEN remains constant).

Again referring to FIG. 4, at a second time period (T=2), it is assumed that the valve linkage has worn and developed slack. This is reflected in that the dead band has increased as shown as span 430 at T=2. Thus, the CS needs to increase from X to YY to overcome the dead band.

In FIG. 5, the flow through a control valve is depicted with relation to the displacement, D, of the control valve vertical stem or rotary shaft. It can be typified as either linear 500 or non-linear 510. It can be expressed as volumetric flow, shown as right-hand vertical axis 530, or as percent of total available flow through the valve, shown as left-hand axis 520. In one form, the valve coefficient, $C_v$, is the ratio of the flow rate through the valve over the displacement of the valve. $C_v$ is dependent on a number of factors, including the condition of the regulating elements of the valve and associated components, such as the valve seat. For example, in a gate valve, the edge of the gate can be worn-away by the abrasive action of fluids or solids. Wear over time can cause $C_v$ to change. Control algorithms often utilize the new, unused, as-installed $C_v$ values as parameters, since they interact with control algorithm factors such as gain. For liquid applications, $C_v$ is often expressed as the number of gallons per minute of 60° F. water that will flow through a particular valve with a one pound per square inch pressure drop.

One equation, as a non-limiting example of a flow model for a control valve, which relates flow through a valve to the valve coefficient is:

$$Q \text{ is proportional to } C_v \times f(l)$$

where Q is the flow rate and $f(l)$ is the function which relates the % of flow to the displacement of the valve stem or shaft. For a linear-acting valve, $f(l)=1$. Other flow control valve models are known to one skilled in the art of automatic flow control.

In FIG. 6, one effect of dead band on process control is illustrated. FIG. 6 shows changes in control signal where a valve has a dead band as shown in 620. Four small steps of change in control signal 600 are made from Time=0 to Time=A, before the dead band is exceeded on the fifth step, finally resulting in a change in valve displacement 610 (and the concomitant change in material flow rate). The pattern is repeated to Time=B and Time=C. However, the process controller then begins to send only 3 steps of change. For the first three steps from Time C, the valve shaft is displaced. But upon reversal of direction in signal, no displacement occurs, through to Time=D, because the dead band is not exceeded. The process controller is calling for changes in the process variable of flow, but because the dead band is so great in relation to the finer calls of control, the calls are never acted on. The net result is precision and responsiveness in overall process control is lost. Further, as wear or adjustments occur over time, the dead band increases, and process control gets increasingly less effective.

As a further source of error in digital signal control systems, FIG. 7 shows the error effect of quantization as analog signals are converted to digital signals ("A/D" conversion). For example, the signaled flow rate from a flow meter can be a 5 to 20 milliamp analog electrical signal 700, which is a continuous range of values. After quantization, the signal is now represented by a relatively small set of discrete symbols or integer values shown as digitized signal 710. Quantization can introduce error into signal processing because signal definition is lost between the different digital intervals, as shown in 720. Thus, as the true analog signal increase from 720A to just under 720B, the converted digital signal value remains the same. This amount of signal definition is thus lost. Because most modern control systems utilize A/D converters, further error is thus often introduced into control algorithms.

Because of the wear over time of mechanical actuator-to-valve linkages and flow-regulating elements of control valves, there is a need for accurate determination, compensation, and management of the effects of such wear in real time during process operations. More particularly, there is a need to reduce the uncertainty associated with hydrocarbon production operations.

Systems for Managing Flow Control Valves in Process Systems

Systems for managing flow control valves in process systems. The operational condition of a valve can be managed based at least on changes in the valve dead band. A non-linear dynamic model can determine in real-time the present valve dead band by modeling the actual flow through the valve and the commanded drive signal to the valve. The present dead band can be used to update the valve control algorithm and to make a maintenance decision regarding the valve.

The present flow coefficient can also be determined in real-time by removing the dead band from the drive signal and using that modified control signal in a flow rate model of the valve to adaptively find the present value of the coefficient with reference to the actual flow through the valve. The flow coefficient can also be used to update the valve control algorithm and to make a maintenance decision regarding the valve.

In some embodiments (but not necessarily all), the disclosed ideas are used in real-time to monitor the mechanical condition of a flow control valve acting to control the flow rate of a flow stream in a process system.

In some embodiments (but not necessarily all), the disclosed ideas are used in real-time to monitor the slack in the linkage in a flow control valve and/or the degree of wear in the flow-restricting elements of a flow control valve acting to control the flow rate of a flow stream in a process system.

In some embodiments (but not necessarily all), the disclosed ideas are used in real-time to update the control algorithm of a flow control valve acting to control the flow rate of a flow stream in a process system.

In some embodiments (but not necessarily all), the disclosed ideas are used to perform predictive maintenance on a flow control valve acting to control the flow rate of a flow stream in a process system.

The disclosed innovations, in various embodiments provide one or more of at least the following advantages:

Real-time monitoring of the operational condition of flow control valves without the need for off-line testing or tear-down;

Improved process control by automatically adjusting process control algorithms based on the effects of wear;

Automatic detection of deleterious changes in the looseness or tightness in flow control valves as to their effect on process control;

Reduction of necessary operator skill necessary to assess the operational condition of flow control valves; and Reduction of unplanned process shut-downs due to failures of flow control valves.

BRIEF DESCRIPTION OF THE DRAWINGS

The disclosed innovations will be described with reference to the accompanying drawings, which show important sample embodiments of the invention and which are incorporated in the specification hereof by reference.

FIG. 1A shows a preferred embodiment of the present innovations for a control method and system for managing flow control valves in process systems.

FIG. 8A shows results for flow rate measurements and estimations from Example 1 using enlarged portions of FIG. 8.

DETAILED DESCRIPTION OF THE PREFERRED EMBODIMENTS

The numerous innovative teachings of the present application will be described with particular reference to the presently preferred embodiment (by way of example, and not of limitation).

There are several ways the generalized innovations can be implemented, and some examples follow. In general terms, these innovative concepts include, in one embodiment, non-linear modeling of the dead band dynamics of a control valve as expected in normal operation in real time. In another embodiment, the present innovations include embodiments that uses an adaptive parametric controller to determine the flow valve coefficient of a flow control valve during operation in real time.

Figure 1:
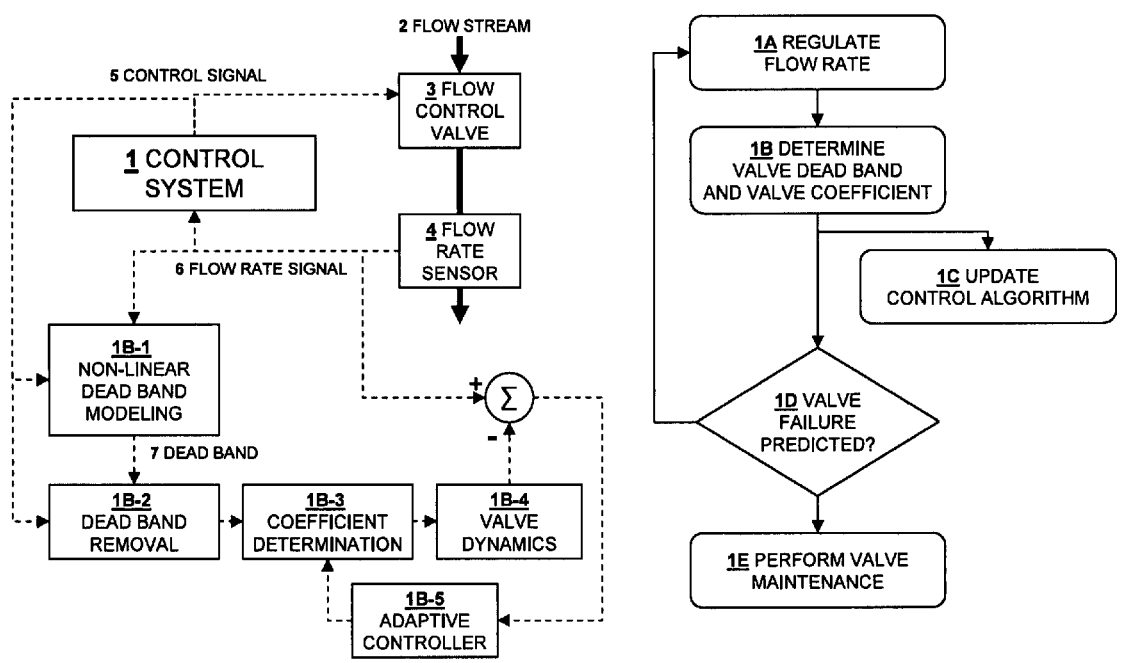
FIG. 1 shows one embodiment of the present innovations for a control method and system for managing flow control valves in process systems.

FIG. 1 shows a generalized embodiment of the methods and systems of the present innovations. A flow control valve 3 can be controlled by control system 1 with control signal 5. A flow stream 2 can enter valve 3 and also pass through flow rate sensor 4, which can be a flow meter of a type as known to one skilled in the art of flow meter design and selection. Note that flow rate sensor can be located prior to valve 3, with little or no effect on the benefits of the present innovations. Flow sensor 4 can provide flow rate signal 6 to control system 1, to non-linear dead band modeling stage 1B-1, and to a summing stage for use in determining the present value of the flow valve coefficient. Stage 1B-1 can model and determine the present value of the dead band of valve 3, shown as dead band signal 7, based on the current control signal 5 and the flow rate signal 6. Dead band removal stage 1B-2 can remove the dead band determined in Stage 1B-1 from control signal 5, and then output the modified control signal to valve coefficient stage 1B-3. Stage 1B-3 can determine the valve coefficient based on the modified control signal and the output of adaptive parametric controller stage 1B-5. Valve dynamics stage 1B-4 can calculate the predicted flow rate from a physical flow model of control valve 3, and the predicted rate, based on a given flow coefficient, can be compared in a summation stage against the actual flow rate from sensor 4. The difference can be caused by a change in the given valve coefficient. Adaptive stage 1B-5 can process the difference to determine the present valve coefficient by driving the difference from said summing stage to zero.

Referring again to FIG. 1, the systems and methods of the present innovations can thus regulate flow stream 2 as action 1A. Using the previously described method using stages 1B-1 through 1B-5, the innovations can determine the present value of the dead band and valve dead band as action 1B. The innovations can then update the control algorithms in control system 1 as action 1C. The innovations can also make a prediction and/or decision on valve mechanical failure as action 1D by comparing the present values of the dead band and valve coefficient against various decision criteria as generally known to one skilled in the art of flow control valve maintenance. For example, a maintenance decision criteria can be to perform maintenance when the dead band exceeds 15% of total control signal span.

FIG. 1A shows a preferred embodiment of a control system and method for the present innovations as applied to flow control of a process stream in a continuous process. Control system 10 can receive a set point 5A for the desired flow rate of flow stream 7A. Control system 10 can operate on and command flow control valve 20 to physically control the flow rate of flow stream 7A to that set point using control drive signal 15. A flow rate sensor 30 can sense the actual rate and feed-back the value to control system 10 using signal 35. Note that flow sensor 30 can alternatively be placed before flow control valve 20 without any significant effect on the benefits of the present innovations. Control system 10 can utilize a variety of control algorithms to effect control of the flow rate as known to one skilled in the art of process control. The actual flow rate value as signal 37 can also be sent to summing stage 90 to be compared against the output of flow control valve dynamics calculation stage 70, as described later. The actual flow rate value signal can also be sent to a non-linear modeling system 40 for determination and modeling of the dead band, e.g. mechanical slack, associated with flow control valve 20. Modeling system 40 can receive the commanded control drive signal 15, and can then determine the dead band based on that signal and signal 37.

Stage 40 can operate as follows. A non-linear modeling system can be used to determine the dead band. This model assumes a dead band behavior and uses the drive inputs and flow outputs to characterize this dead band. Due to quantization errors, this is accomplished in two steps. First, the dead band region is approximated by looking for directional changes in the valve and directly estimating the size of the dead band region. Secondly, an adaptive system is used to further refine the dead band by comparing the error of the valve model with the actual system and changing the estimate of the dead band such that the error goes to zero. The error of the valve model and actual system is pre-filtered to only adapt when the system travels through the dead band zone so it does not adapt to changes in the flow characteristics of the valve due to supply or pressure changes. Due to the quantization error on the embodied system, without the adaptive component it can have an error up to 40% depending on present valve wear. A neural network can also be used to determine the dead band.

The present value of the dead band can be represented as signal 45. Stage 50 can then receive and modify control signal 15 for the effect of the dead band by removing the dead band value from the control signal. The effects of the dead band can removed before the valve coefficient is determined in stage 60 so the system does not erroneously fit the nonlinear dead band into the valve coefficient calculation. Thus, the dead band is virtually removed from the system before the valve coefficient is determined, and as the control element dead band increases or decreases due to wear or adjustment, stage 50 can thus proactively correct for the change.

The corrected or modified control signal can then be inputted into stage 60 to determine the flow coefficient for flow control valve 20 based on the modified signal and the output of adaptive controller stage 80. This system can allow for the monitoring of the valve without regard to the dead band, therefore enabling the detection of failure in the supply system.

Stage 60 can use adaptive parametric controller 80 to find the best fitting valve coefficient. This can also be done using a least squares method or other ways to curve-fit the data to a "line of best fit" or statistical "best fit" as is well known to a skilled person in statistics. For example, "best fit" methods are routinely applied to calculating values of constants in equations to allow equations, or "lines of best fit" to represent data sets with minimum error. Three illustrative definitions of the "line of best fit" are: (1) The University of Cambridge (England) website "thesaurus.maths.org" defines "line of best fit" as: "The straight or curved line which gives the best approximation to a given set of data. Different measures are possible to describe goodness of fit. One commonly applied criterion to find the line which minimizes the mean square error in the dependent variable." Available on the Internet at: http://thesaurus.maths.org/mmkb/entry.html?action=entryById&id=441, last visited on Oct. 11, 2006; (2) The website of the University of St. Andrew's (Scotland) uses "line of best fit" in its definition of "linear regression line": "Linear regression line: A "line of best fit" depicting the linear relationship between two variables. The line is characterized by two features, slope and intercept. The formula for the best-fit straight line can be used to predict one variable from another." Available on the Internet at: http://www.st-andrews .ac.uk/academic/psychology/teaching/glossary.shtml#L, last visited on Oct. 17, 2006. (3) Bournemouth University (England), on it's Media School's webpage for "Learning to Handle Data Effectively, defines "line of best fit" as "'Line of Best Fit': A mathematically calculated line on a regression plot which allows us to predict the value of the dependent variable (on the y axis) given a specific value of the independent value plotted on the X axis", Available on the Internet at: http://media3.bournemouth.ac.uk/spss/focus_pages/main_glossary.htm#Latin, last visited on Oct. 17, 2006.

The adapted flow coefficient can be inputted in flow control valve dynamic model stage 70. Stage 70 can calculate the flow rate of flow stream 5 using a flow model of valve 20.

Because flow valve coefficients change over time, adaptive controller 80 can adjust the present value of the coefficients or constants within the dynamic model to achieve substantially a zero difference from stage 90. Note that both stage 40 and stage 60 can feedback present values of the dead band 45A and the flow control valve coefficients 85, respectively, to control system 10. Control system 10 can use those present values to update its control algorithm or algorithms to improve its control over flow control valve 20.

EXAMPLE 1

Figure 8:
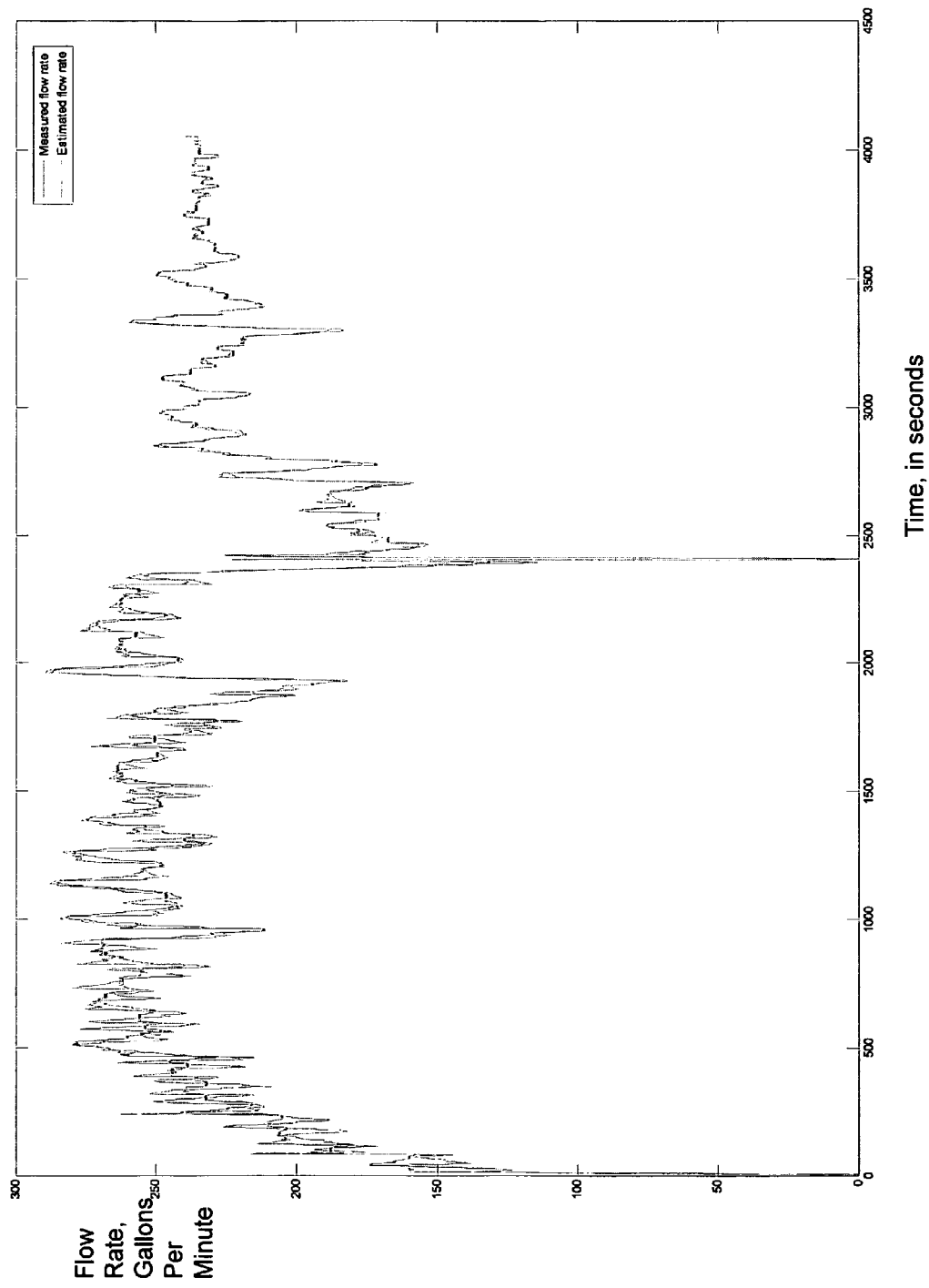
FIG. 8 shows results for flow rate measurements and estimations from Example 1 using a preferred embodiment of the present innovations.

At a hydrocarbon production site, a process fluid flow stream was passed through a rotary-actuated control valve and a flow meter for a period of about 4300 seconds at flow rates varying between 150 and 300 gallons per minute. FIG. 8 shows the recorded (e.g. "measured") data for the actual flow rate as measured by the actual flow meter, represented in FIG. 1A as flow rate sensor 30, and as regulated by the actual rotary control valve (flow control valve 20), which was being signaled by an automatic controller (within control system 10). FIG. 8 also shows a simulated (e.g. "estimated") flow rate using the systems and methods of the present innovations. Note that the drive signal (signal 15) data to the rotary control valve was also recorded, but is not displayed in FIG. 8.

Using the method of FIG. 1A, both measured flow rate (signal 37) data and the drive signal data were processed at a later time off-line in a control algorithm simulation program, "MATLAB", from The MathWorks, Inc., Natick, Mass., USA.

Figure 9:
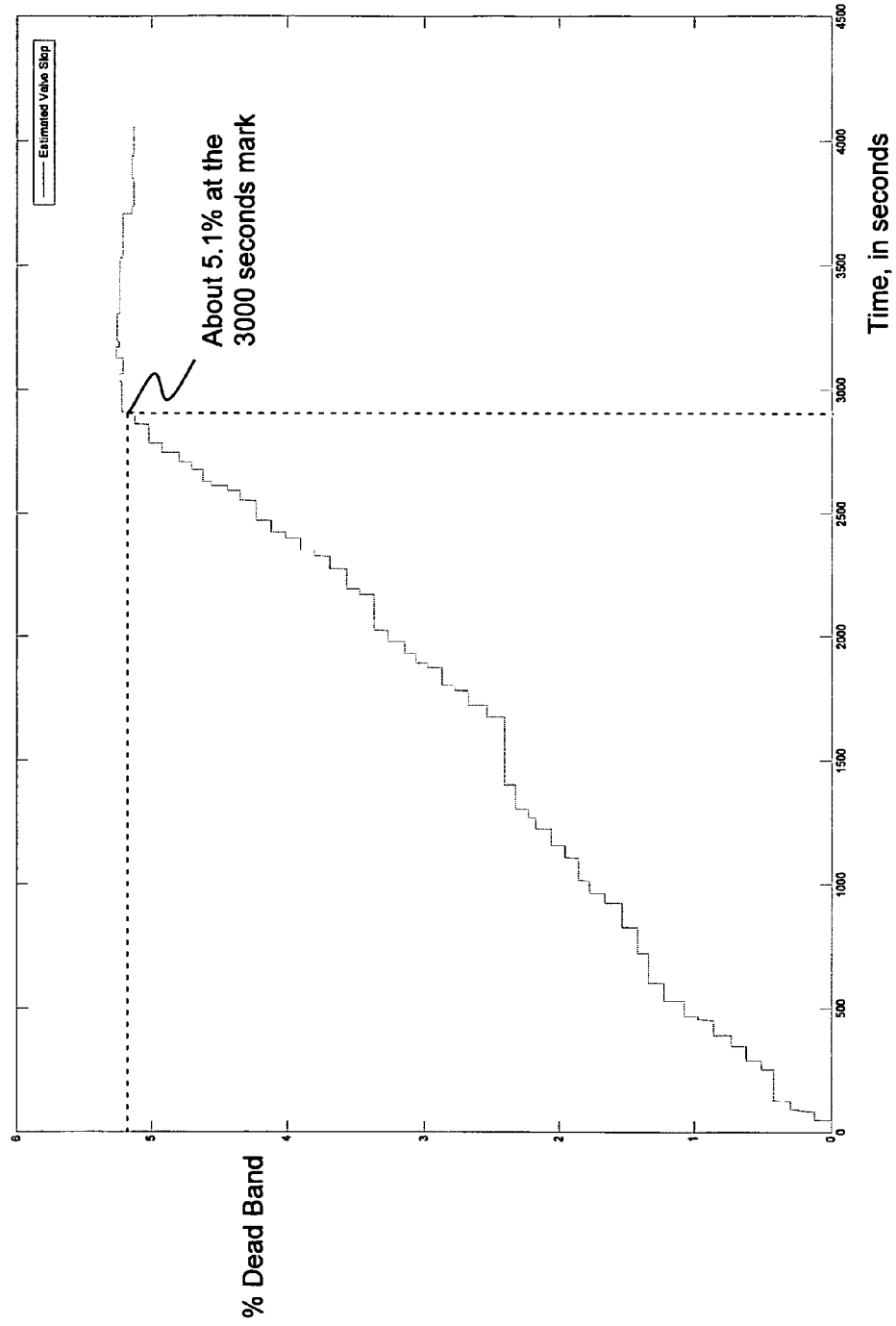
FIG. 9 shows results for dead band determinations as "valve slop" from Example 1 using a preferred embodiment of the present innovations.

FIG. 9 shows the estimated dead band (signal 45) from the simulation for the control valve, e.g the valve "slop" or valve mechanical slack, over the period of the test, using the systems and methods of the present innovations. Note that at about 3000 seconds, the estimated dead band reaches about 5.1% and then levels off for the rest of the period. Because the non linear model of stage 40 is a learning model, approximately 3000 seconds (about 50 minutes) were required to converge on the valve dead band at 5.1%, from an initial estimate of zero at zero seconds. In actual on-going use of the present innovations, this learning period would thus take an initial 50 minutes and then not be repeated again, for example, until the valve was removed from service, maintained, and then re-installed and started-up again. Additionally, measureable wear in mechanical linkages generally occurs over days or weeks of control valve use, not in a matter of less than an hour.

FIG. 8A shows three enlarged areas from three time periods in FIG. 8 to illustrate the increased accuracy of control valve characterization as non-linear model 40 converged on the value of the valve dead band using the systems and methods of the present innovations. The periods were Period 1, from about 500 to 1000 seconds, Period 2, from about 2000 to 2500 seconds, and Period 3 (near the end of the total run), from about 3500 to 4200 seconds.

In Period 1, the measured flow rate (signal 37) is individually apparent and distinct from the calculated flow rate (e.g. "estimated" in FIG. 8) and has periods of relatively constant flow rates as flow rate set points were frequently changed to various desired flow rates and the controller responded by driving the control valve to achieve the new desired rate. The calculated flow rate, represented in FIG. 1A as the output of stage 70 going into summing stage 90, is doing a relatively poor job of matching the measure flow rate. In Period 2, the calculated flow rate is much closer to the actual flow rate from Period 1, and in Period 3, they are virtually indistinguishable. Thus, as the dead band estimate converged to the actual value (in this case about 5.1%), the methods and systems of the present innovations increased in accurate monitoring of the operational condition of the valve as evidenced by increased accuracy in the calculated flow rate relative to the actual flow rate.

In actual operation, the present innovations would be part of the control system operating a control valve. The present innovations so utilized can map the wear of the control valve over time and in real time, such that a decision can be made to perform maintenance.

Figure 2:
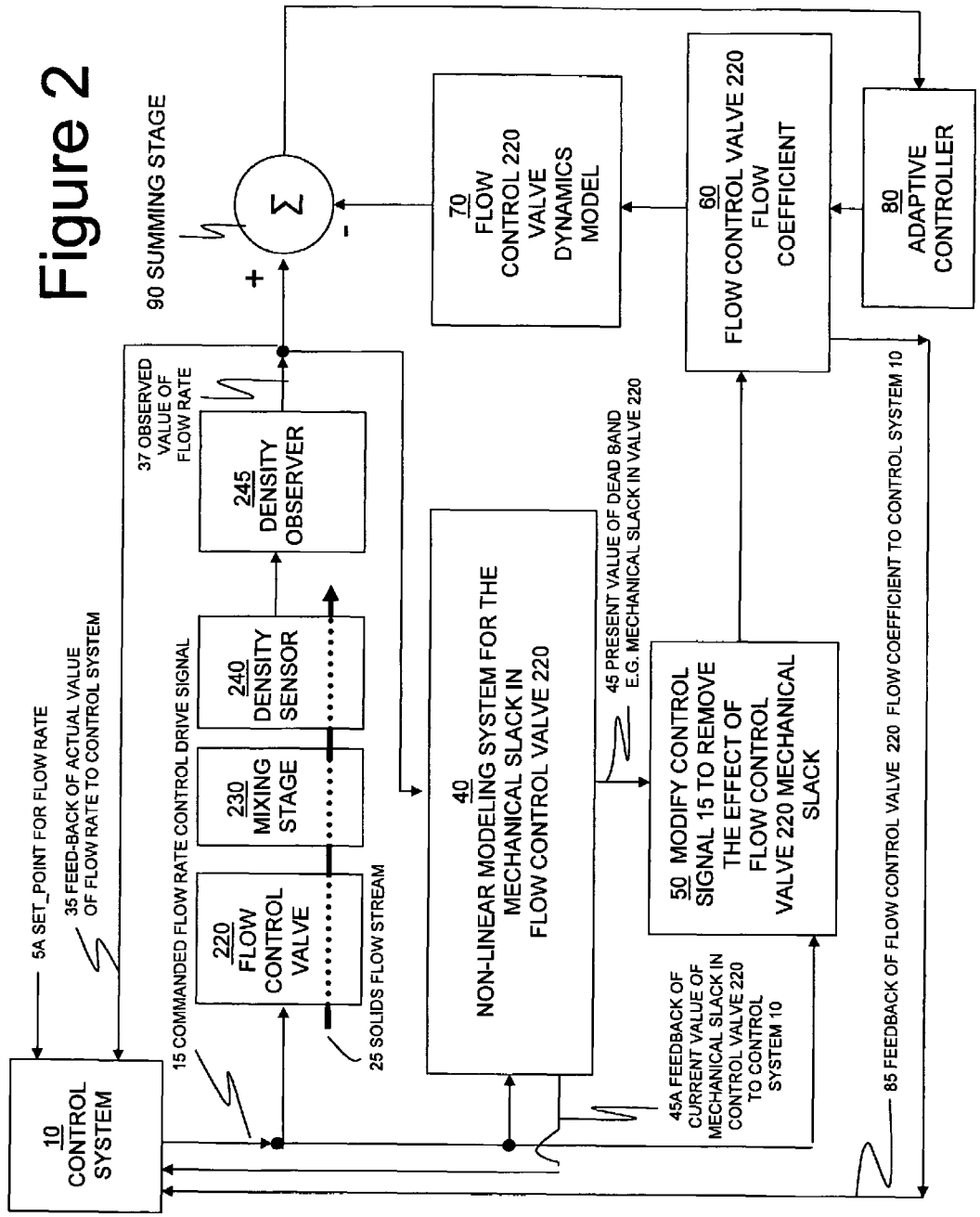
FIG. 2 shows another embodiment of the present innovations for a control method and system for managing flow control valves in process systems using an observer rather than a sensor for determination of the actual flow rate of a process flow stream.
Figure 3:
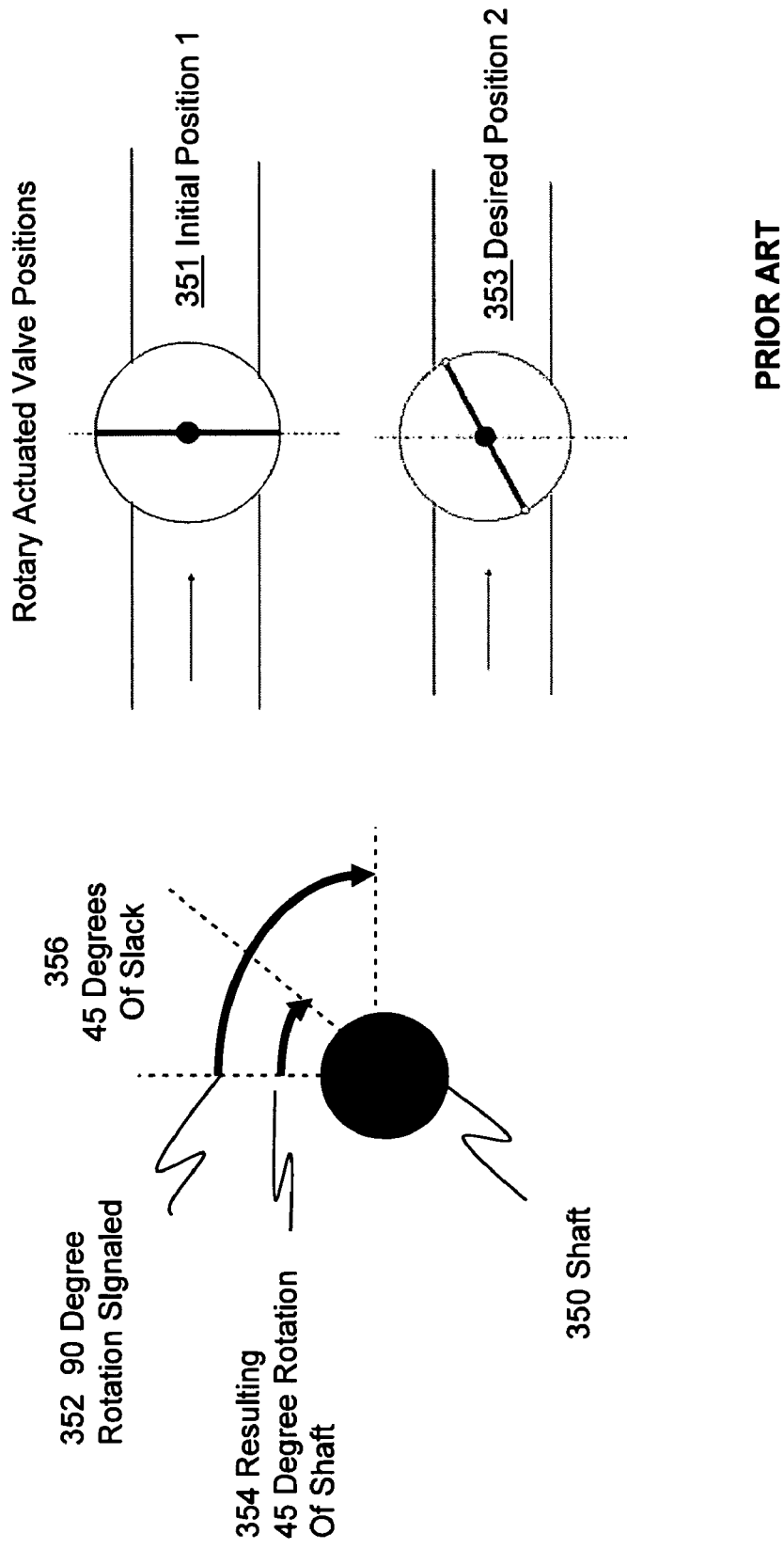
FIG. 3 shows a rotary-actuated flow control valve as an example of a flow control valve that can be managed using at least one of the present innovations.
Figure 4:
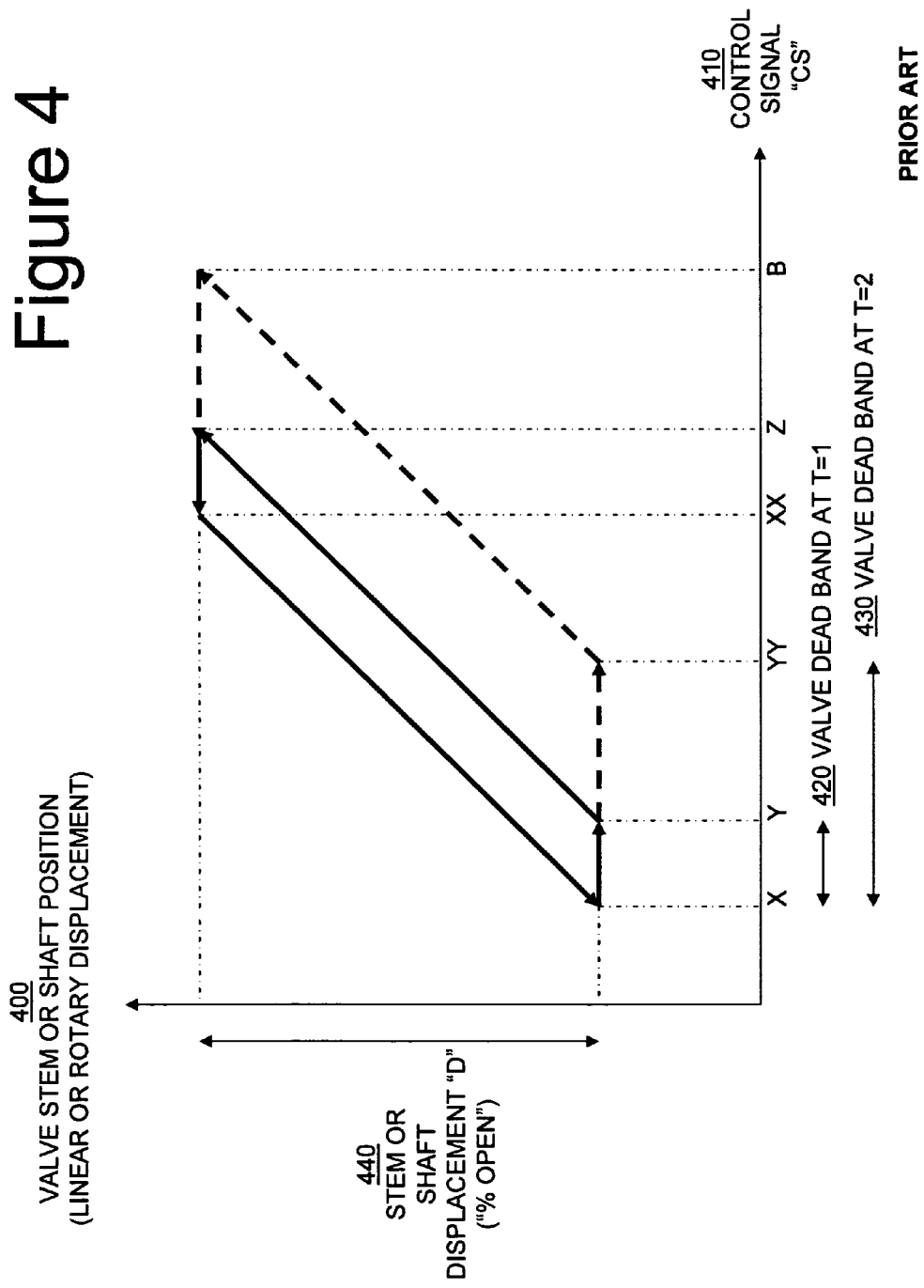
FIG. 4 shows a graphical depiction of dead band in a generalized process control action which can be managed using at least one of the present innovations.
Figure 5:
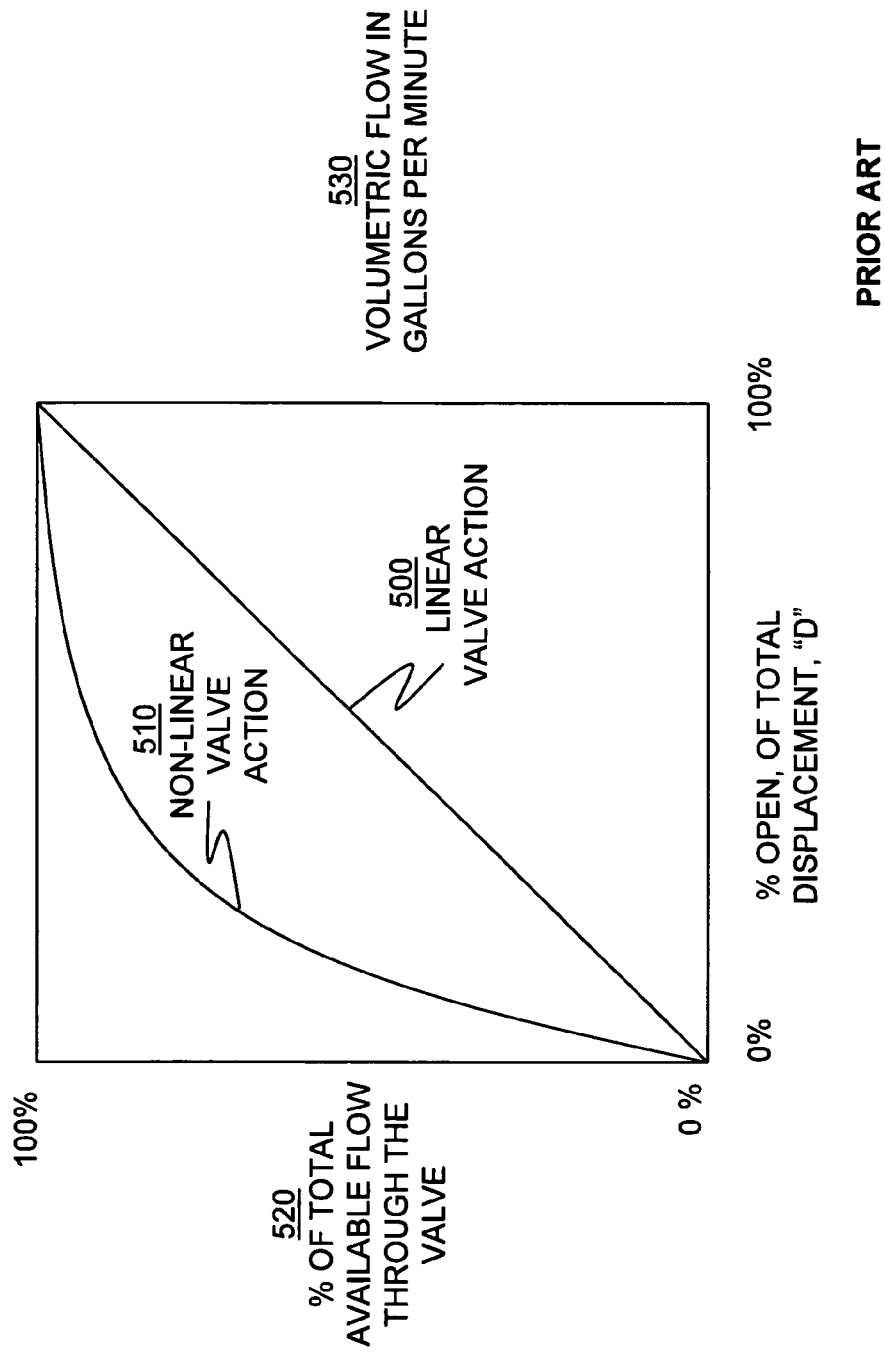
FIG. 5 shows a graphical depiction of flow control valve action which can be managed using at least one of the present innovations.
Figure 6:
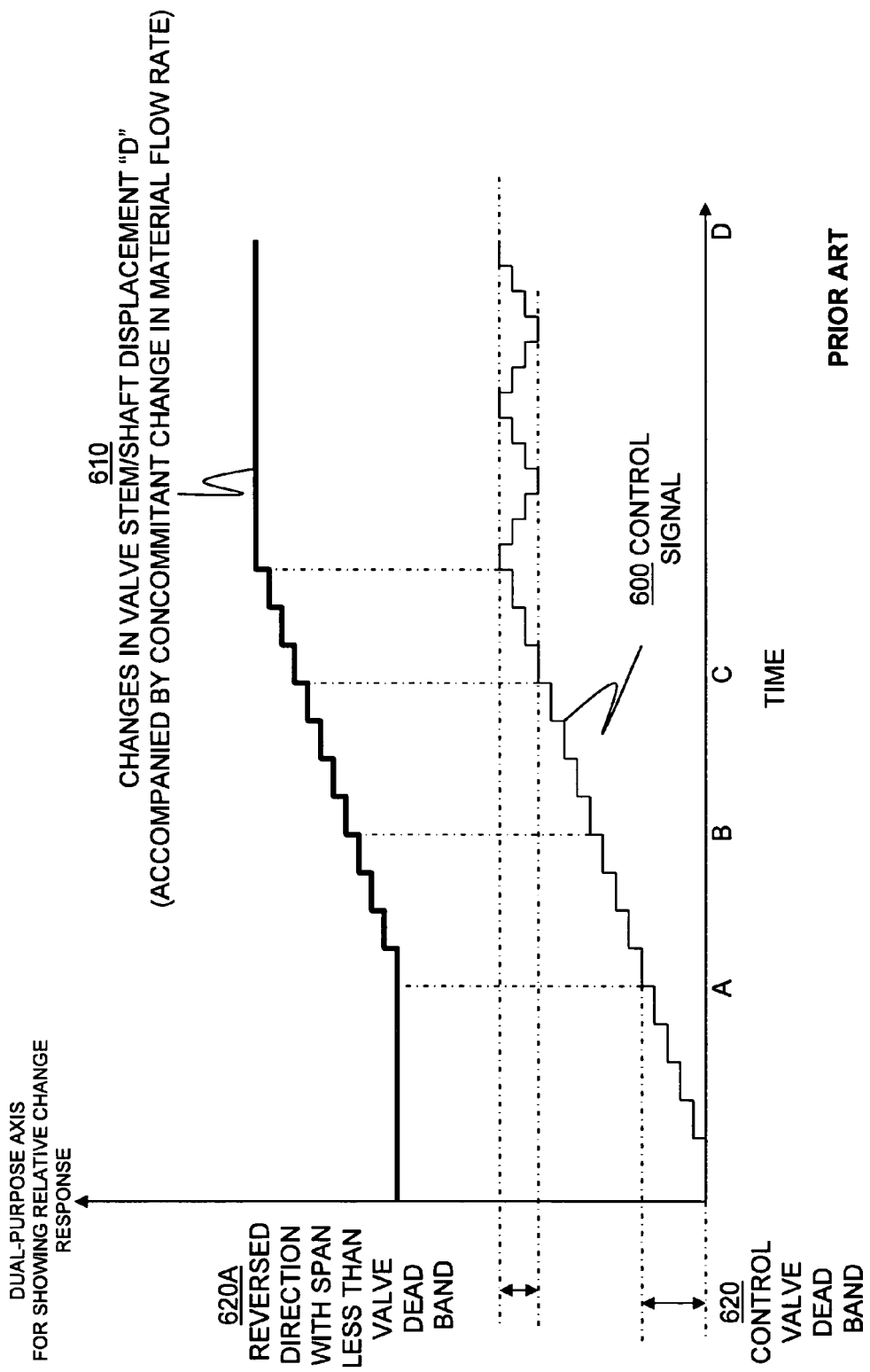
FIG. 6 shows a graphical depiction of an effect of dead band in the process control of fluid flow using a flow control valve which can be managed using at least one of the present innovations.
Figure 7:
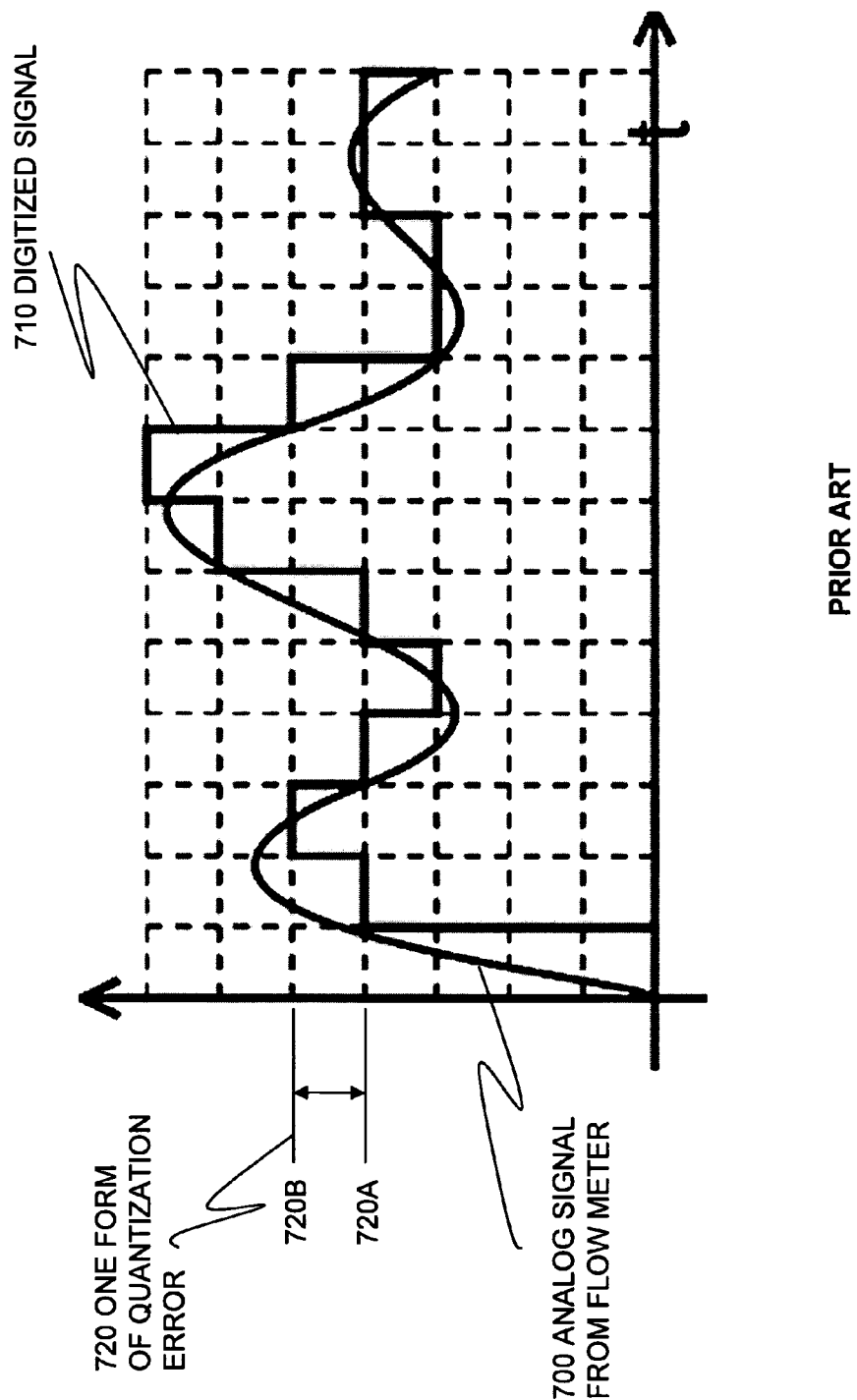
FIG. 7 illustrates the effect of analog-to-digital (A/D) signal conversion and quantization that can be managed using at least one of the present innovations.

FIG. 2 is another embodiment of the present innovations applied to a solids flow stream 25 in which flow control valve 220 is a solid-handling valve or metering device instead of a fluid as in FIG. 1A. In FIG. 2, stream 25 is being continuously charged into a continuous mixing stage 230, which is also receiving a separate fluid flow stream, such as water (not shown), which can be easily measured for flow rate. In the case of the solids flow stream, the flow rate is not easily measured. However, the solids flow rate can be inferred from the use of a density observer 245 using density readings from a density sensor 240, because in this case, the specific density of the solid is different than the specific density of the fluid. See U.S. patent application Ser. No. 11/121,144, referred to previously, for details of how the density observer can provide signal 37 as an observed value of the solids flow rate of stream 25. Other than the use of an observer rather than a sensor and the adaptation to a solids flow control system and method, FIG. 2 operates essentially the same as FIG. 1A.

According to a disclosed class of innovative embodiments, there is provided a system for managing the operational condition of a flow control valve in a process system, comprising: a flow control valve acting on a flow stream; a sensor configured to measure the flow rate of said flow stream; a non-linear dynamic model for determining the present value of the dead band of said control valve based at least on the control signal to said control valve and the flow measurement of said sensor; and an output of said present dead band value as an indication of the operational condition of said valve.

According to a disclosed class of innovative embodiments, there is provided a system for managing the operational condition of a flow control valve in a process system, comprising: a flow control valve acting on a flow stream; a sensor configured to measure the flow rate of said flow stream; a computer system connected to said valve and said sensor; and configured to provide: non-linear dynamic modeling of the present value of the dead band of said valve based at least on the control signal to said valve and the flow rate measured by said sensor; and an output of said present dead band value as an indication of the operational condition of said flow control valve.

According to a disclosed class of innovative embodiments, there is provided a system for controlling the flow rate of a flow stream, comprising: a flow control valve acting on a flow stream; a computer system connected to said valve and said sensor; and configured to provide: (i) a control signal to a flow control valve acting on a flow stream; (ii) a determination of the present flow rate of said flow stream; (iii) a determination of the present dead band of said valve based at least on (i) and (ii); (iv) a determination of the present flow coefficient of said valve based at least on (i), (ii), and (iii); and (v) an update to a controller providing said control signal to said control valve based at least on the results of actions (iii) and (iv).

Modifications and Variations

As will be recognized by those skilled in the art, the innovative concepts described in the present application can be modified and varied over a range of applications, and accordingly the scope of patented subject matter is not limited by any of the specific exemplary teachings given. It is intended to embrace all such alternatives, modifications, and variations that fall within the spirit and broad scope of the appended claims.

The methods and systems of the present application can operate across a wide range of process flow stream situations and conditions. One of ordinary skill in the art, with the benefit of this disclosure, will recognize the appropriate use of the methods and systems for a chosen application of a given or dynamic set of operating parameters.

Optionally, the methods and systems of the present application can be configured or combined in various schemes. The combination or configuration depends partially on the required flow rate control precision and accuracy and the operational envelope of the process flow stream. One of ordinary skill in the art of process control, with the benefit of this disclosure, will recognize the appropriate combination or configuration for a chosen application.

Optionally, flags such as a particular process variable out of range which may define the reliability of the data or provide variables to use for process control. One of ordinary skill in the art, with the benefit of this disclosure, will recognize the appropriate additional measurements that would be beneficial for a chosen application.

Optionally, such measurements taken by the methods and systems of the present application may also be sent to an external computing and analysis system for further processing or use.

Optionally, different fluid compositions or recipes can vary from application to application, or across different embodiments, and therefore different reference data sets or curves or models fitted to such data sets may be employed, maintained, or stored in control system 10 or an external computing and analysis system which can communicate with control system 10. One of ordinary skill in the art, with the benefit of this disclosure, will recognize the appropriate systems to employ for such situations.

Figure 10:
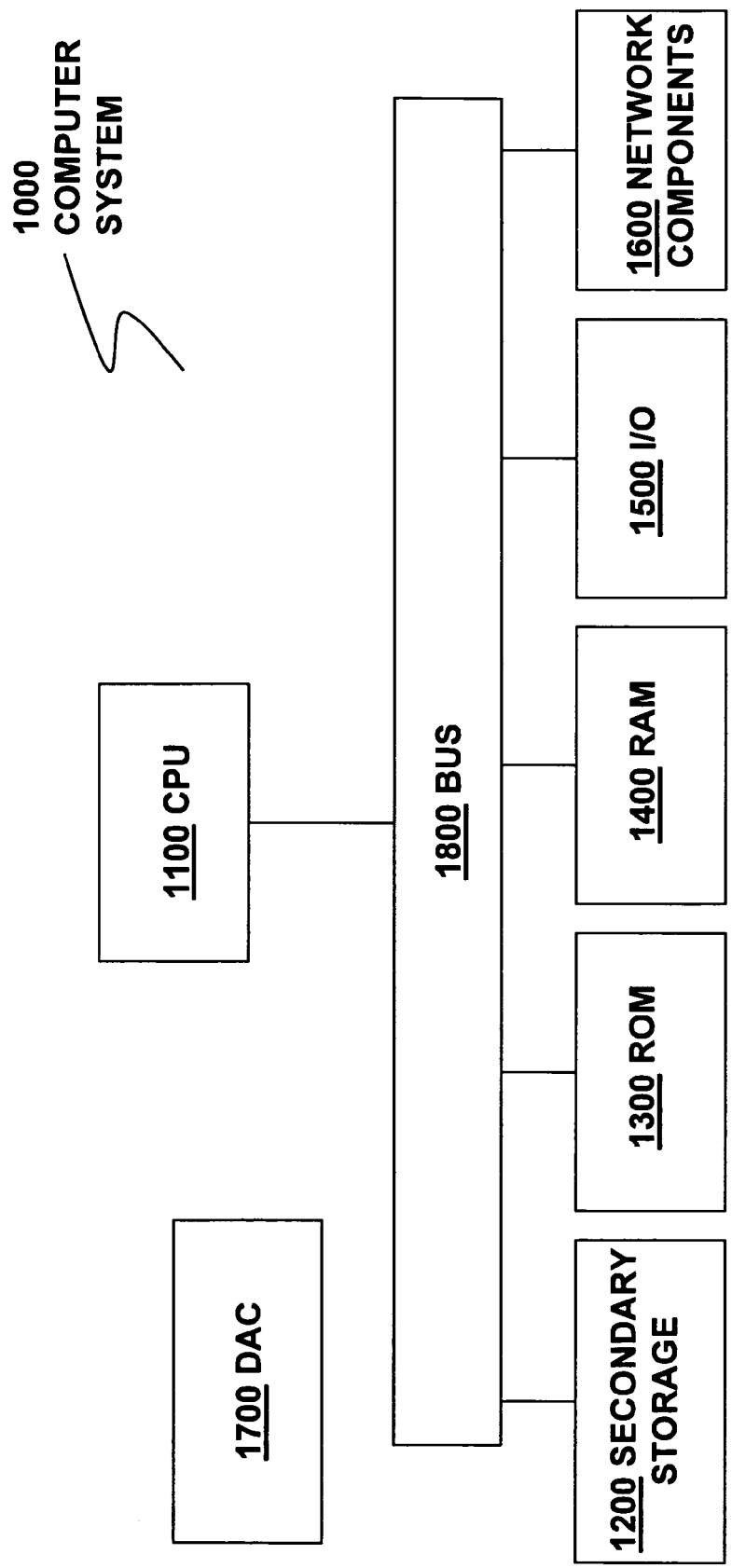
FIG. 10 shows one embodiment of a general purpose computer system suitable for implementing the control systems and methods of the present innovations.

Optionally, the methods and systems of the present innovations can be implemented on general-purpose computers or laptop computer or microprocessor system, or an external computing and analysis system, in addition to being embodied in manufacturing control hardware, as long as such embodiments possess adequate computing resources, memory, and communication capacity to perform the necessary operations requested of them. FIG. 10 shows one embodiment of such a computer system 1000 for implementing one or more embodiments of the methods and systems of the present innovations.

With respect to FIG. 10, system 1000 includes central processor unit (CPU) 1100 which can communicate with various system devices via communications BUS 1800.

Optionally, CPU 1100 can execute codes, instructions, programs, and scripts which it accesses from various disk based systems which can be secondary storage 1200, ROM 1300, RAM 1400, or the network communication components 1600.

Optionally, the set of instructions to CPU 1100 can comprise input instructions that receives data or models from an external system.

Optionally, system 1000 can have more than one CPU chip to increase computing power and resources.

Optionally, various system devices can include memory devices such as secondary storage 1200, read only memory (ROM) 1300, random access memory (RAM) 1400. System 1000 can connect to other systems such as the systems of the present innovations via input/output (I/O) components 1500 and network or communication components 1600.

Optionally, the signal outputs from system 1000 to the flow control valve 20 of FIG. 1A (or valve 220 in FIG. 2) can be converted from a digital to an analog signal by a digital to analog converter (DAC) 1700.

Optionally, additional signal conditioning can be conducted on system 1000 output signals to appropriately communicate with various control elements and actuators such as flow control valves 20 or 220.

Optionally, secondary storage 1200 can comprise one or more disk drives or tape drives for permanent storage of data and as extra memory if RAM 1400 is not of sufficient capacity for a given operation. Secondary storage 1200 can store programs that are loaded into RAM 1200 if such programs are selected for running.

Optionally, ROM 1300 can store instructions and data that can be read during the running of programs. ROM 1300 is a non-volatile memory device.

Optionally, RAM 1400 can be used to store data and to store computing instructions. Speed of access to ROM 1300 and RAM 1400 can be faster than to secondary storage 1200.

Optionally, input/output components 1500 can include video monitors, printers, touch screen displays, liquid crystal displays, keyboards, keypads, on-off buttons, dials, mouse pointing devices, track balls, voice recognizers, card readers, tape readers, and various combinations thereof.

Optionally, network communications components 1600 can be ethernet cards, universal serial bus interface cards, serial interfaces, token ring cards, fiber distributed data interface cards, modems, modem banks, wireless local area network cards, radio transceiver cards such as "Global System for Mobile Communications" radio transceiver cards, and various combinations thereof.

Optionally, components 1600 can enable CPU 1100 to communicate with an Internet or with intranets. In such communications, CPU 1100 can receive information from the nets, or can output information to the nets. Such information can be a computer data signal embodied in a carrier wave or a baseband signal. The baseband signal or signal embedded in a carrier wave, or other types of signals currently used or hereafter developed, can be generated according to several methods well known to one skilled in the art.

Optionally, for digital communications, RS-422 or RS-485 can be used to allow links to control system 10 or to an external computing and analysis system, or to multiple external units.

Optionally, a 4-20 milliamp analog output signal can be used to allow external processing of the system measurements.

Optionally, the methods of the present invention can be embodied in a computer readable medium, including a compact disk.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle. The claims as filed are intended to be as comprehensive as possible, and NO subject matter is intentionally relinquished, dedicated, or abandoned.

What is claimed is:

1. A system for managing the operational condition of a flow control valve in a process system, comprising;
    a flow control valve acting on a flow system;
    a sensor configured to measure the flow rate of said flow stream;
    a non-linear dynamic model for determining the present value of the dead band of said control valve based at least on the control signal to said control valve and the flow measurement of said sensor, wherein the non-linear dynamic model models flow through the valve to determine the present dead band value; and
    an output of said present dead band value as an indication of the operational condition of said valve.

2. The system of claim 1 further comprising:
    an adaptive parametric controller for determining the present value of the flow coefficient of said control valve based at least on a flow model of said valve and said flow rate measured by said sensor; and
    said output is further comprised of said present flow coefficient value as an indication of the operational condition of said valve.

3. The system of claim 1 further comprising a flow rate controller acting on said control valve to regulate the flow rate of said flow stream.

4. The system of claim 1 wherein said output indicates a requirement for performing maintenance on said valve because of excess dead band to at least reduce dead band to an acceptable value.

5. The system of claim 3 wherein said output is used to update said process flow rate controller with the modeled present dead band value correcting a control signal to the flow control valve to remove the dead band value from the control signal.

6. The system of claim 1 wherein said non-linear dynamic model consists of a neural network model and/or non-linear equations.

7. The system of claim 1 wherein said non-linear model dynamically reduces the error in said determination of said present value of said dead band by reducing the error in the model and driving the modeled parameters to actual values.

8. The system of claim 1 further comprising a density observer and/or a volumetric observer.

9. The system of claim 1 wherein said flow control valve is selected from the group consisting of a rotary-actuated control valve, a vertically-actuated control valve, an actuated metering valve, an actuated gate valve, an actuated ball valve, an actuated globe valve, an actuated diaphragm valve, a variable rate dump valve, a rotary valve, a rotary vane valve, a rotary pocket valve, a variable rate slide gate valve.

10. The system of claim 1 wherein said flow rate is of a type selected from the group consisting of fluid flow rate, liquid flow rate, solid flow rate, gas flow rate, slurry flow rate, and multiphase fluid flow rate.

11. A system for managing the operational condition of a flow control valve in a process system, comprising:
    a flow control valve acting on a flow stream;
    a sensor configured to measure the flow rate of said flow stream;
    a computer system connected to said valve and said sensor; and configured to provide:
    non-linear dynamic modeling of the present value of the dead band of said valve based at least on the control signal to said valve and the flow rate measured by said sensor; and
    an output of said present dead band value as an indication of the operational condition of said flow control valve;
    wherein the non-linear dynamic model models flow through the valve to determine the present dead band value and update a flow valve control algorithm.

12. The system of claim 11 wherein:
    said computer system is further configured to provide an adaptive parametric computation of the present value of the flow coefficient of said valve based at least on a flow model of said valve and said flow rate measured by said sensor; and
    said output is further comprised of said present flow coefficient as an indication of the operational condition of said flow control valve.

13. The system of claim 11 further comprising a flow rate controller acting on said control valve to regulate the flow rate of said flow stream.

14. The system of claim 13 wherein said output is used to update said process flow rate controller with the modeled present dead band value correcting a control signal to the flow control valve to remove the dead band value from the control signal.

15. The system of claim 11 wherein said output indicates a requirement for performing maintenance on said valve because of excess dead band to at least reduce dead band to an acceptable value.

16. The system of claim 11 wherein said non-linear dynamic modeling is performed using a neural network model and/or non-linear equations.

17. The system of claim 11 wherein said non-linear dynamic modeling reduces the error in said determination of said present value of said dead band by reducing the error in the model and driving the modeled parameters to actual values.

18. The system of claim 11 wherein said computer system is further configured to include a density observer and/or a volumetric observer.

19. A system for controlling the flow rate of a flow stream, comprising:
- a flow control valve acting on a flow stream;
- a computer system connected to said valve and said sensor; and configured to provide:
  - (i) a control signal to a flow control valve acting on a flow stream;
  - (ii) a determination of the present flow rate of said flow stream;
  - (iii) a modeling of the present dead band of said valve based at least on (i) and (ii);
  - (iv) a modeling of the present flow coefficient of said valve based at least on (i), (ii), and (iii); and
  - (v) an update to a controller providing said control signal to said control valve based at least on the results of actions (iii) and (iv), wherein the modeling uses a non-linear dynamic model to model flow through the flow control valve and to update a flow valve control algorithm in the controller with the modeled present dead band value.

20. The system of claim 19 wherein said computer system is further configured to provide the results of (iv) by:
  - (i) removing said present dead band from said control signal;
  - (ii) calculating a value for the present flow based on action (i) using a flow model of said valve; and
  - (iii) determining said present flow coefficient with an adaptive parametric computation by manipulating said coefficient within said flow model with reference to the results of action (b).

* * * * *